United States Patent
Hollar

(10) Patent No.: US 7,624,282 B2
(45) Date of Patent: Nov. 24, 2009

(54) METHOD AND APPARATUS FOR DVD COPY PROTECTION WITH SELECTIVE DATA PATTERN INSERTION

(75) Inventor: Mark A. Hollar, Palo Alto, CA (US)

(73) Assignee: Macrovision Corporation, Santa Clara, CA (US)

( * ) Notice: Subject to any disclaimer, the term of this patent is extended or adjusted under 35 U.S.C. 154(b) by 568 days.

(21) Appl. No.: 10/964,572

(22) Filed: Oct. 12, 2004

(65) Prior Publication Data

US 2006/0078111 A1 Apr. 13, 2006

(51) Int. Cl.
*G06F 11/30* (2006.01)
(52) U.S. Cl. .................................................. 713/189
(58) Field of Classification Search ................ 713/189; 380/201
See application file for complete search history.

(56) References Cited

U.S. PATENT DOCUMENTS

| 4,603,413 | A | 7/1986 | Sinjou et al. |
| 6,021,199 | A * | 2/2000 | Ishibashi ............... 380/217 |
| 6,353,890 | B1 * | 3/2002 | Newman .................. 713/193 |
| 2002/0018565 | A1 * | 2/2002 | Luttrell et al. ............ 380/217 |
| 2004/0017914 | A1 * | 1/2004 | Tada ......................... 380/201 |
| 2004/0088557 | A1 * | 5/2004 | Malcolm et al. .......... 713/193 |
| 2005/0015616 | A1 * | 1/2005 | Hogan ...................... 713/200 |

FOREIGN PATENT DOCUMENTS

| EP | 0 918 326 A | 5/1999 |
| WO | WO-98/54713 A1 | 12/1998 |
| WO | WO-02/11136 A1 | 2/2002 |
| WO | WO02/11136 A1 * | 2/2002 |
| WO | WO 0211136 A1 * | 2/2002 |

(Continued)

OTHER PUBLICATIONS

Kesden, "Course: 15-412 Operating Systems: Design and Implementation, Lecture 33", Dec. 6, 2000.*

(Continued)

*Primary Examiner*—Nasser G Moazzami
*Assistant Examiner*—Michael S McNally
(74) *Attorney, Agent, or Firm*—Morrison & Foerster LLP

(57) ABSTRACT

Method and apparatus for inhibiting unauthorized copying of data content of DVDs or CDs or other types of optical discs. DSV (digital sum value) data patterns are inserted into selected sectors of the data to be recorded on the optical disc. These selected data sectors are also those to which is applied the conventional CSS (content scrambling system) encryption conventionally used to copy protect DVD content. Only those sectors (e.g., one out of four) subject to the CSS encryption have the DSV data patterns inserted therein. This advantageously results in the CSS encryption effectively hiding these inserted DSV data patterns from the mastering DVD encoder used in producing DVDs. Effectively thereby the DSV data patterns "tunnel through" the mastering DVD encoder. The hidden DSV data patterns are only revealed when the CSS sectors are decrypted prior to the action of the writer used to copy the DVD/CD content. This results in those DSV data patterns being left in the clear at the writer so they are effective to result in an error-filled DVD data file which is not suitable for play back when recorded by the writer on another optical disc.

14 Claims, 7 Drawing Sheets

FOREIGN PATENT DOCUMENTS

WO     WO-2004/075186    *   9/2004

OTHER PUBLICATIONS

International Search Report mailed on Aug. 22, 2006 for PCT Application No. PCT/US2005/036327 filed on Oct. 8, 2005, six pages.

Kesden, G. (Dec. 6, 2000). "Course:15-412 Operating Systems: Design and Implementation—CSS:Introduction," located at <http://www.cs.cmu.edu/~dst/DeCSS/Kesden/index.html>, 13 pages.

Lookabaugh, T. et al. (May 2004). "Selective Encryption for Consumer Applications," *IEEE Communications Magazine* 42(5):124-129.

* cited by examiner

METHOD AND APPARATUS FOR DVD COPY PROTECTION WITH SELECTIVE DATA PATTERN INSERTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

This invention is directed to copy protection of the type used, e.g., in DVDs (digital versatile disc). More generally it is directed to copy protection of the content of optical discs and to optical discs so protected.

BACKGROUND

Copy protection is well known in the video and audio field. It has especially become important for use with digital media such as optical discs, of which one type is DVDs. Further, recordable compact discs (CD) and the associated writers are now available to the public. This means that improved methods for copy protecting optical discs are in demand. See for instance International application WO 98/57413, incorporated herein by reference in its entirety, disclosing a method of providing an optical disc with an authenticating signature. The authenticating signature is arranged so that it is not, or cannot be, copied by available equipment for reading and writing data from compact discs (CD) or DVDs or other types of other optical discs. In that application a data sector of a CD is intentionally provided with a pattern of errors which cannot be corrected by the error correcting devices present in the typical CD player and thereby constitutes an uncorrectable sector or a bad sector on the disc. The existence of the expected bad sector is taken as an authenticating signature and is used to identify a genuine (not illegally copied) disc.

See also International Application WO 02/11136 A1, incorporated by reference in its entirety, which provides a method of copy protecting optical discs by employing an authenticating signature. The authenticating signature may be used alone or used with a bad sector signature as described in WO 98/54713 or with other authenticating signatures.

These prior approaches use what are called DSV (digital sum value) data patterns which when read by a typical CD or DVD player indicate errors. Typically these data patterns can be encoded and written to the master during the DVD/CD manufacturing process by a typical laser beam recorder (of the type used in mastering) with good readability. However, recording these patterns using a typical consumer type CD or DVD writer produces an encoding which creates DSV problems and hence causes data errors in the resulting data file produced by the writer. When this data file is copied to another optical disc and subsequently read by a typical CD or DVD player, the DSV values accumulate or decrement and the resulting DSV causes problems for the player, thus causing the player to report errors and/or fail to return the correct content. This effectively discourages copying because the copied disc is thereby not usable.

These approaches rely on the fact that the mastering equipment for producing an optical disc has a more sophisticated encoder than is present in consumer type optical disc (CD or DVD) writers. If, however, the encoders present in consumer type CD or DVD writers achieve the same level of sophistication as the encoders used in the mastering process, these methods may not be effective for copy protection. Hence this is a limitation in these prior approaches, and improved copy protection is desired.

SUMMARY

There is provided a method of copy protecting data to be marked onto an optical disk such as a DVD or CD. As is well known, the data on such disks is organized into a plurality of sectors. In accordance with the present method, predetermined data patterns of the DSV type are inserted into selected ones of the sectors. Typically these DSV patterns include, when played back, repeated patterns of values causing high DSV values which are of the type normally not permitted on CDs or DVDs, as explained above. In the above described approaches using DSV data patterns, these patterns are inserted in each and every sector. In accordance with the present method, the DSV data patterns are inserted only in those particular selected sectors which are subject to the conventional content scrambling system (CSS) encryption. CSS is a well known encryption system (explained further below) widely used in the optical disk field. Typically the CSS is only applied to every nth sector (where e.g. n=4) for purposes of playback efficiency. Here the DSV patterns are inserted only in those selected sectors subject to the CSS encryption or to some other data transformation of the type used in the optical disk field. Thereby advantageously the DSV data patterns are hidden by the subsequent CSS encryption of those sectors but are revealed when the data is decrypted for copying. The resulting DSV data patterns do disturb the subsequent playability of any copied disc, thereby inhibiting illegal copying more effectively than in prior approaches.

Also contemplated, in addition to the above method of producing optical discs, are the resulting optical disks themselves (including the masters and consumer discs) and the associated "image file" which is the data output of a DVD or CD authoring tool which is then used to make the master optical disc, the image file typically being stored on a digital record carrier such as a computer hard disk or computer memory.

DETAILED DESCRIPTION

By way of background, the following briefly describes the well known CSS (content scrambling system) which is a well known encryption standard used for some years on commercial DVDs and employed by typical DVD players. Its purpose is to prevent illegal copying of the content of DVDs. The CSS standard is sponsored by an organization called the DVD CCA. CSS is a form of data encryption used to discourage reading media files directly from a disc without the provided decryption key. Typically a 5 byte (40 bit) CSS key is needed for decryption and is provided on the DVD.

Subsequent to introduction of CSS, various hackers determined how to break into the CSS encryption due largely to security errors by one of the vendors of DVD players. These hackers made available to the public software popularly called "DeCSS" referring to decrypting of CSS. DeCSS is a software tool that allows decryption of a CSS encrypted DVD and the copying of all or selected data files from the DVD to, e.g., a computer hard disk for subsequent downloading onto some other media such as a DVD writeable disc. Essentially DeCSS is a utility program that copies the encrypted DVD video file from the DVD and saves it to a computer hard disk in decrypted form.

Figure 1:
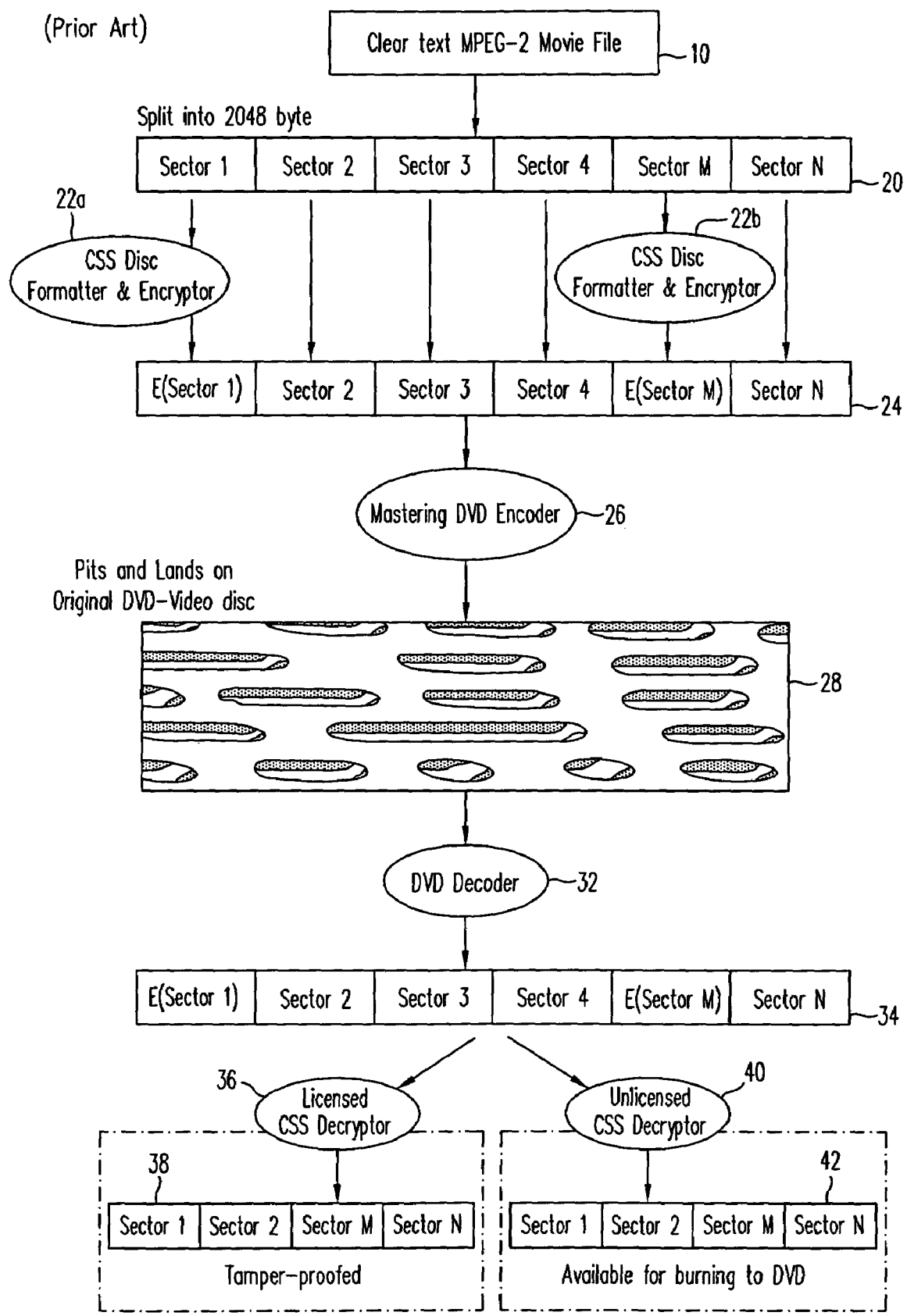
FIG. 1 shows a method known in the art for producing and playing back an optical disc and including the use of encryption therein.

The process of manufacturing a DVD with CSS encryption and also playing back such as DVD is well known in the art and shown diagrammatically in FIG. 1. In the first step 10, the clear text MPEG-2 movie (or other) file is provided, e.g., by a movie studio. This is a compressed video file of a standard type. In the next step 20, this movie file is split into 2,048 bit sectors here numbered sectors 1-N. In the next step at 22a, 22b, certain selected sectors (in this case every M sector where M=4) are subject to CSS disk formatting and encryption. Note that not every sector has CSS applied. This is because at the time of play back as described below, decrypting CSS takes processor capacity. Hence only by encrypting selected sectors the processing is performed faster at the player thus requiring less computing power in the player. (This is especially important when the player is a personal computer.)

In the next step 24, the sectorized file is provided with, in this case, sectors 1 and M encrypted (and thus designated here by the letter E) and the remaining sectors not encrypted. This partially encrypted file is then supplied to the mastering DVD encoder which is a computer based device. This encoder output is then used to drive the laser beam recorder which actually inscribes the pits and lands on the original (master) DVD at 28. Then by well known steps not shown here, this master disc is used to produce submasters which in turn stamp out a large number of consumer discs to be distributed to consumers.

The next step at 32 occurs upon playback at the DVD decoder which is circuitry (and software) present in the consumer's DVD or other optical disc player. The DVD decoder converts the signals from the disc's pits and lands into a set of sectors as shown, with certain of the sectors encrypted at 34. In the typical use of such system at 36 by a legitimate consumer, the DVD player includes licensed CSS decryption software which decrypts the encrypted sectors (using the CSS keys on the disc) and provides, as shown in the lower left at 38, a set of N sectors of data which are data suitable for conventional display and conversion to analog form using the CSS licensed tamper proof software.

On the other hand, on the right hand branch at 40, a hacker uses DeCSS which is unlicensed and hence unlawful (under the Digital Millennium Copyright Act) but widely available. This results in a series of 1-N sectors available for writing (in unauthorized fashion) to another disc for unlicensed use or sale. Thus this lower right hand portion of FIG. 1 depicts the hackers' activity.

Note that the data at 34 is not useful to a hacker because if a hacker did take this data and attempted to "burn" (write) the data to another DVD, the needed CSS keys would be lost and hence the data could not be decrypted. The data 34 is of no use to the hacker because the writeable DVD media (disc) does not allow for the storage of the CSS cryptographic keys as required by the DVD standard in the lead-in area of the disk. As mentioned above, these keys are necessary in a DVD player for any subsequent decryption. Hence this data is regarded as tamper proof. In addition, note that the data at 38 is acted upon within a "tamper proof" application. Thus, a hacker is not able to gain access to the decrypted data at this point.

Hence DeCSS which is generally referred to as "circumvention software" is employed. As shown in FIG. 1, the data that results from use of DeCSS is the only type of output data that is of any use to a hacker in sending the data subsequently to a DVD writer.

Figure 2:
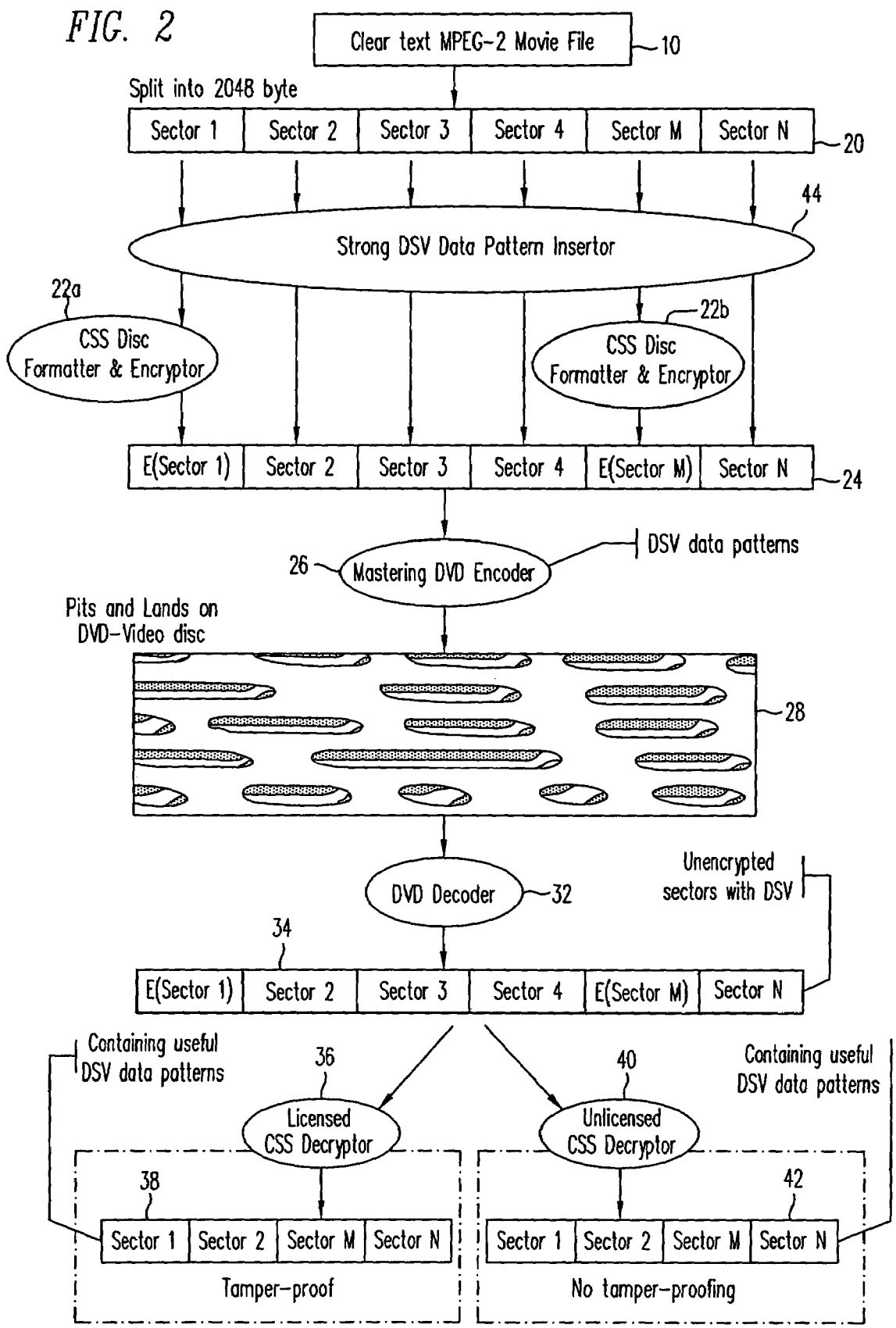
FIG. 2 shows a method of producing an optical disc and playing it back using DSV data pattern insertion.

FIG. 2 shows an analogous process to that of FIG. 1 using the DSV data pattern insertion as described above. In this case strong DSV data patterns are inserted in each sector prior to CSS encryption and prior to operation of the mastering DVD encoder at 26. Hence most of the elements in FIG. 2 are identically labeled to those in FIG. 1 ("Strong" and "weak" in this context refer to the relative effectiveness in disturbing recording). An additional element present in FIG. 2 not present in FIG. 1 is the strong DSV data pattern inserter 44 which is typically embodied in the software used in the mastering process. FIG. 2 however is not necessarily effective since it will be demonstrated that strong DSV patterns cannot be used.

In this case at 26 the DSV data patterns are now present in both unencrypted and encrypted sectors and cause the output of the mastering DVD encoder to have undesirable problems with playability. As shown at 38 similar to FIG. 1, the resulting data is decrypted data being acted upon by a tamper proof application for display and conversion to analog form under the CSS license but with playback disturbed in the unencrypted sectors. Hence upon playback there are useful (effective) DSV data patterns in the formerly encrypted sectors which in this case are sectors 1 and M (as designated by the E.) In order for this method to work, weak DSV patterns must be used. With weak patterns, there are no playability problems but the effectiveness in disturbing recorders is lower.

In further detail, DSV is a well known property of encoded digital data. In the realm of optical discs, DSV is a computation of a running difference of the number of pit T states and the number of land T states detected on the disc surface as shown in FIGS. 1 and 2 at 28. DSV is determined by assigning the value plus one to each land on the DVD and minus one to each pit. Ideally the resulting DSV, which is a running total, deviates as little as possible from the value of zero. If the DSV has a rapid change of rate over a significant period of time, or if the DSV has substantial low frequency components, then the transitions in the resulting EFM (Eight to Fourteen Modulation) signal may be shifted from their ideal values and/or the ability of tracking and focus circuits in the optical disk drive to maintain optimal head positioning may be compromised. This typically causes read failures from the optical disc. Data is encoded on the optical disc, for instance a DVD, as pits and lands in a form at least three bits and at most 11 bits long. This is referred to as 3T-11T where T has a one-bit period. The data signal is derived from the lengths of the pits and lands, not their mere presence. The resulting signal forms a square wave known as the EFM signal. The digital sum value (DSV) is then the running difference between the number of T values where the EFM signal represents a pit and the number of T values where the EFM signal represents a land.

The original data, divided into eight bit bytes, before being recorded on the master is passed through a process known as EFM encoding to produce predetermined 14 bit symbols which are especially designed to level out the number of pits and lands on the disc (that is to help maintain a balanced DSV value approaching zero) and to ensure that there are no symbols which violate the EFM encoding scheme of 3T-11T.

In order to maintain good DSV characteristics, the DVD mastering encoder 26 often has a choice in the "merge bits" which it provides to insert between the 14 bit data symbols. When encoding certain special patterns of data, the encoder 26 has a very much reduced ability to choose suitable merge bits due to the run-length limiting rules which place limitations on the merge bits which can precede or follow certain of the 14 bit symbols. The encoder 26 therefore effectively loses much of its control of the DSV while this data is being encoded. It is critical that it chooses correctly in the few locations where it has a choice.

A sophisticated type encoder such as that generally provided in the mastering DVD encoder 26 shown above may have the foresight, or can be designed, to choose a pattern of merge bits which is not optimal for the immediate disc locality where this locality is followed by one in which the run length limiting rules dictate the merge bits. Encoders with a larger look ahead capability are able to make more preparations for encoding the troublesome data and hence the overall encoding will be better. On the other hand, in general and up to now, consumer type CD or DVD writers typically have very little ability to look ahead (due to having less computational capacity) and hence when they lose control of the DSV value, it is more likely to result in an unreadable data file. The above mentioned copy protection schemes using DSV rely on this factor, which however it is believed may not be available in the future due to the increasing sophistication of consumer type disc writers.

Note that in the above application WO 02/11136 A1 there is identified a number of values capable of causing DSV problems because of their EFM pattern at the pits and lands level. When the DSV data patterns for these values are processed through the EFM decoder of a consumer type optical disc player, the DSV accumulates or decrements and this can result in read failures. Of course the encoding process for a CD is designed to prevent values capable of causing DSV problems from occurring in the EFM pattern as well as providing suitable error correction.

As mentioned above, in application WO 02/1136 A1, there is provided on an optical disc what is referred to as an authenticating signature which comprises several sectors having repeated DSV values interspersed by padding areas. Pre and post padding areas consisting of blank sectors are typically added to the disc around the authenticating signature. These may be helpful to the mastering encoder 26 and provide time which the encoder 26 can use to make an optimum choice of merge bits. In addition the use of padding areas of blank sectors also increases the combination of authenticating signatures available.

FIGS. 7A and 7B of that application disclose schematically one example of data patterns suitable for DSV pattern insertion. FIG. 7A shows only the first four bytes of a 2,048 block byte block of user data. This data is changed, as described above, to cause DSV problems, and FIG. 7B of that disclosure only shows the first four bytes of a 2,048 byte data pattern resulting from the changes to the user data of FIG. 7A. Typically when a disc is copied using a relatively unsophisticated optical disk writer, the authenticating signature is corrupted or unreadable thereby producing a resulting optical disc which has severe readability (playability) problems. Accordingly, the less sophisticated writers will write a disc which when read will result in the disc player returning corrupted data or information signaling a read error, hence making that disc not usable.

The present inventor has determined that, as mentioned above, as the consumer type DVD writers become more sophisticated and approach the sophistication of the mastering DVD encoder 26, there may be little or no opportunity to select suitably strong DSV patterns. As such, selecting patterns for DSV that are effective against such writeable DVD encoders would result necessarily in the generation of problematic data by the mastering DVD encoder 26 for those sectors that are not CSS encrypted. While those sectors which receive both the DSV pattern insertion and are CSS encrypted successfully survive the mastering DVD encoder and DVD decoder process, those sectors that are not CSS encrypted (typically the majority of the sectors) introduce unacceptable playability errors during playback of a legitimate DVD disc.

Hence use of the DSV pattern insertion loses its usefulness.

Figure 3:
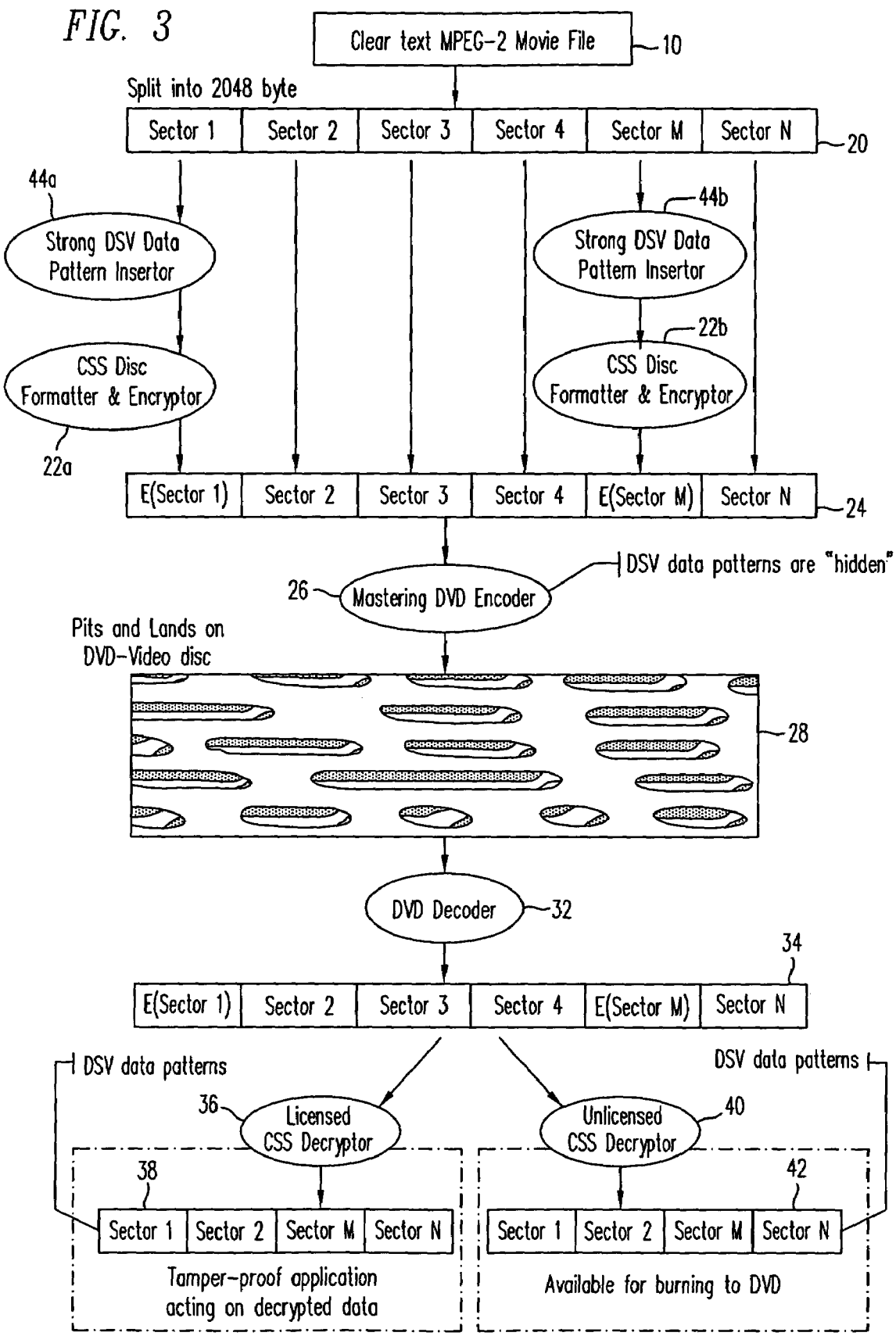
FIG. 3 shows a method of producing an optical disc and playing it back using DSV data pattern insertion as disclosed herein.

FIG. 3 shows a method in accordance with this disclosure with most elements labeled similarly to FIGS. 1 and 2. However, in FIG. 3 the strong DSV data pattern insertion operates only on selected sectors, here sectors 1 and M, which are those sectors also subject to the CSS encryption. Hence in this case strong DSV data pattern inserter functionality is shown only at 44a and 44b for sectors 1 and M, indicated as being encrypted by the letter E. In other words the strong DSV data pattern insertion only occurs on those sectors that are to be subsequently CSS encrypted during the mastering process. This allows the subsequent CSS encryption (which is a data transformation) to "hide" the problematic inserted DSV data patterns from the mastering DVD encoder 26. Thereby at 26 the inserted DSV data patterns are hidden by the prior CSS encryption and cause no problem to the mastering DVD encoder 26. Effectively therefore the DSV data pattern "tunnels through" both the mastering DVD encoder 26, and the subsequent DVD player decoder 32 in the player that is used to play back the commercial marketed DVD. Only at 36 and 40 in the DVD player, it is finally revealed that the DSV data patterns are present by the either licensed or unlicensed CSS decryption. This results in, at 38, the decrypted data output as provided by the licensed CSS decryptor 36 where display and conversion into analog form occur before. In this instance since only display and conversion are intended, and no recording is to be done, the DSV that are revealed are suitable. At 42 this results in data which is decrypted and while available for writing to a DVD, has DSV in sectors 1 and M which when recorded to a DVD will introduce errors to the recording process. This thereby inhibits unauthorized copying, as intended.

Since the hacker at 42 wants to subsequently record his unencrypted data 42 to a subsequent recordable media or disc so that it will playback in a wide variety of players, the DVD DSV data patterns are now left in the clear so that they operate effectively during any subsequent re-recording to interfere with playability. The so called "clear" DSV patterns are now available to unfavorably impact the DVD encoder 48, FIG. 4 in a downstream recorder or drive to provide a corrupted copy of the original data.

Note that the issue of which particular sectors are subject to CSS encryption and the DSV data pattern insertion in FIG. 3 is a matter of industry or disc/player manufacturer choice. In the example shown in FIGS. 2 and 3, one out of four sectors is subject to CSS encryption.

Figure 4:
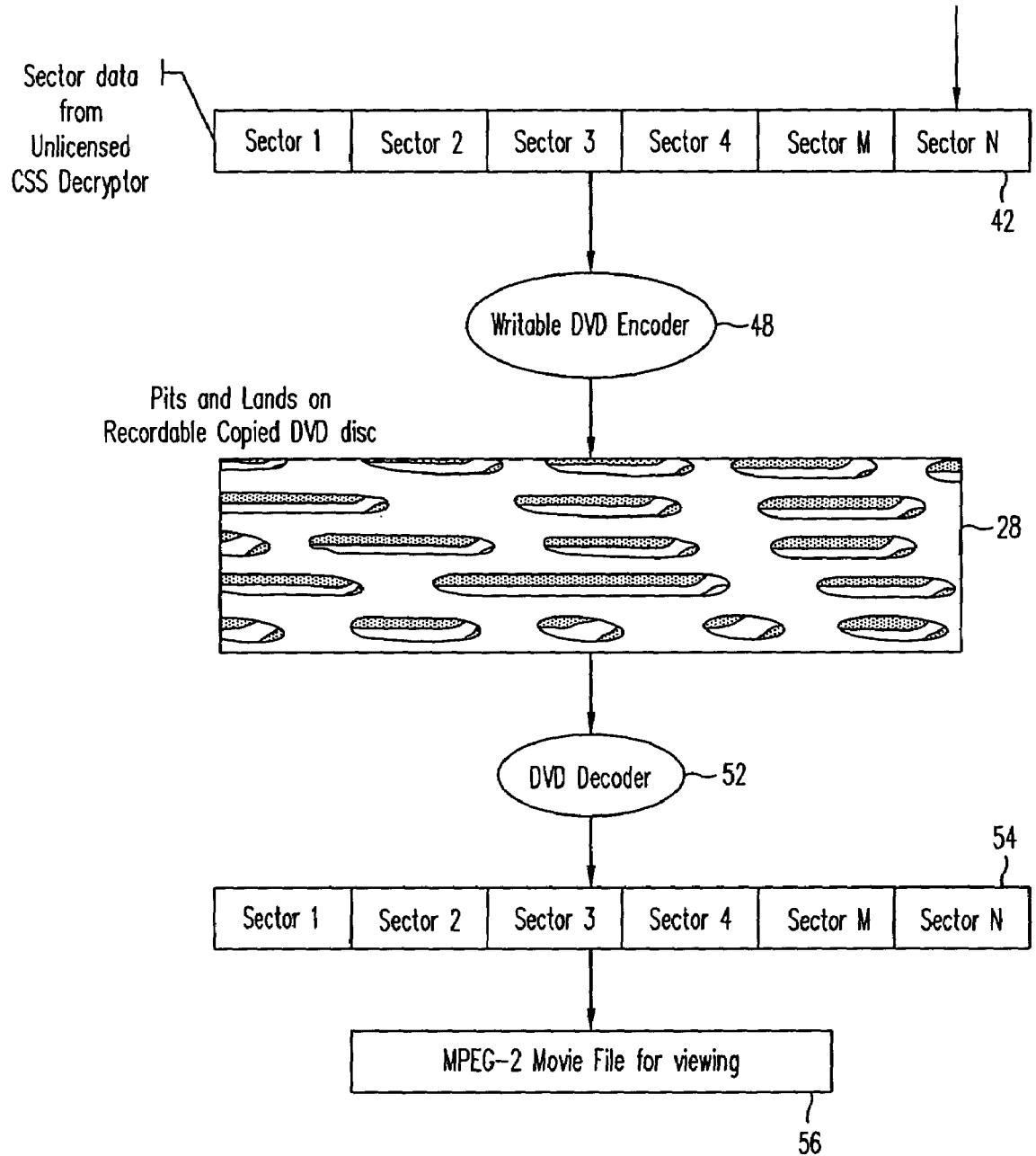
FIG. 4 shows the process of playing back a DVD using a typical consumer DVD writer.

FIG. 4 illustrates diagrammatically conventional operation of a DVD or other optical disc writer. This process employs the data 42 as produced in FIG. 3 and hence also illustrates playback in accordance with the present method. The sector data from the unlicensed CSS decryptor 42 (same as in FIG. 3) is provided to the encoder of the DVD recorder 48. This encoder 48 then generates the signals which drive the laser beam device of the writer and writes the various pits and lands 50 on the recordable (writeable) DVD disc. Later on this disc is then made available for play on a DVD player and the resulting signals are subject to the DVD player decoder 52 which outputs data 54 with the sectors 1 through N. This data is then converted to an MPEG-2 movie file 56 for viewing. The resulting MPEG-2 movie file 56 is then applied for instance to a suitable decoder and viewed. Note that if the DSV pattern inserter 44a, 44b of FIG. 3 operates as intended, sectors 1 to M of movie file 54 are corrupted and not readable.

Figure 5:
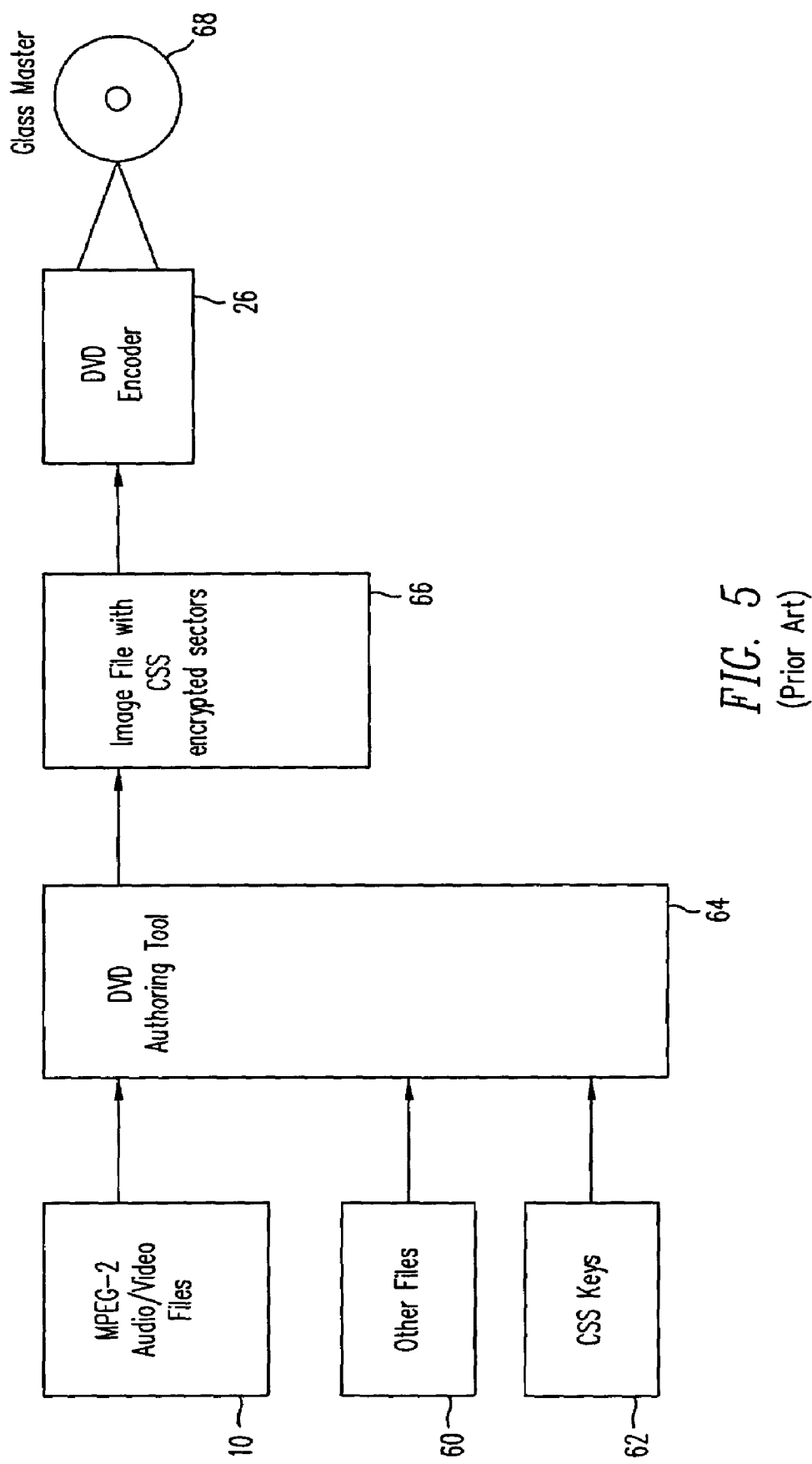
FIG. 5 shows as known in the art use of a DVD authoring tool and CSS encryption to produce an optical disc.

FIG. 5 shows the process of producing a CSS encrypted DVD master in the prior art. As indicated above, an MPEG-2 audio/video file or files 10 (see FIG. 1) are provided. Also a set of other files 60 for navigation and images of the type provided on a typical movie DVD are provided together with a set of (at least one) CSS keys 62. These files all are then supplied to the DVD authoring tool 64 which is software tool which outputs an image file with a CSS encrypted sectors 66 using the CSS encryption keys. This is then provided to DVD encoder 26 (see FIG. 1) which is connected to drive the laser beam recorder tool which forms the pits and lands on the resulting master DVD 68 as is conventional. This master 68 is then further used to produce the DVDs sold to the public.

Figure 6:
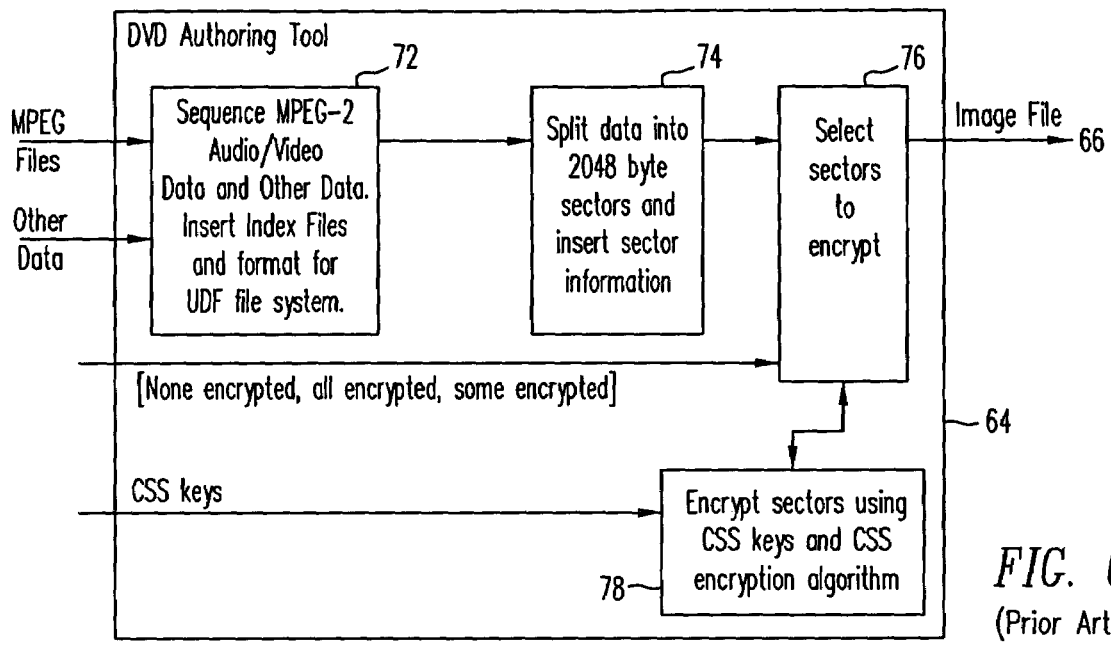
FIG. 6 shows as known in the art use of a DVD authoring tool including encryption.

FIG. 6 shows the DVD authoring tool 64 of FIG. 5. Note that the mastering tool (FIG. 7) and the authoring tool (FIG. 6) are generally used by different entities in the DVD production process. In the DVD authoring tool 64 in the prior art, the first step is to sequence the MPEG-2 audio/video data files and other data as shown for instance in FIG. 5 and format these for the UDF file system at 72. The resulting data is then sectorized into 2,048 (2K) byte sectors into which the file data is inserted, see FIG. 1. The next step is to select which sectors to encrypt as shown in FIG. 1 at 24. The choices are that none are encrypted, all are encrypted or some are encrypted. As shown in FIG. 1, typically some are encrypted, for instance every fourth sector. The CSS keys are then provided from an external source as shown for instance in FIG. 5 at 62. The CSS keys 62 are used at 78 to encrypt the selected sectors using the CSS keys and the CSS encryption algorithm, as carried out by the CSS disk formatter and encryptor 22a in FIG. 1. This produces the image file 66.

Figure 7:
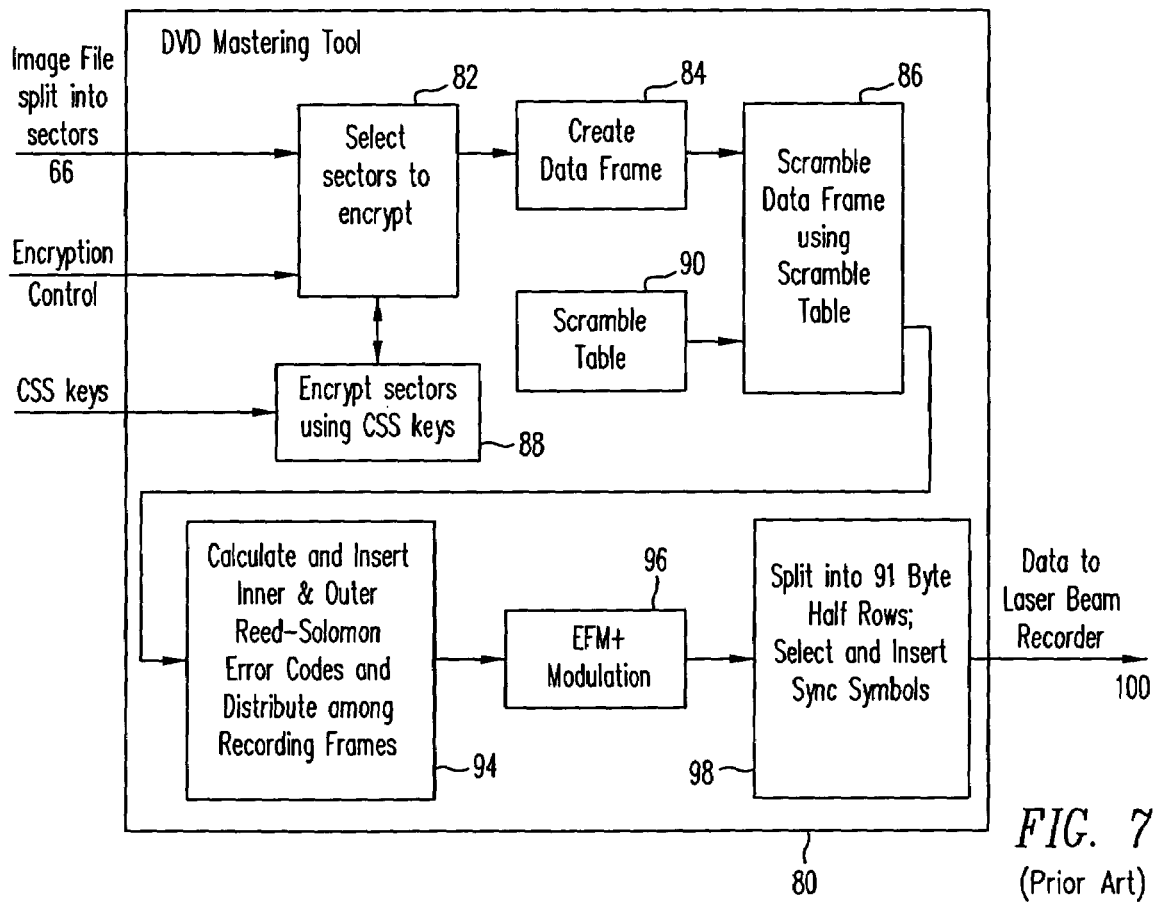
FIG. 7 shows as known in the art use of a DVD mastering tool including encryption.

As well known in the field, CSS encryption can be performed by one of two possible entities which are the authoring tool (FIG. 7) or the mastering tool (FIG. 7). As shown in FIG. 7, the incoming image file 66, for instance from a prior art DVD authoring tool, is sectorized into sectors and then supplied to the DVD mastering tool 80. The first step 82 selects which sectors to CSS encrypt. (This corresponds to step 76 in FIG. 6.) Next the data frames are created at 84 and the data frames are subject to the conventional scrambling (this is not the CSS) using the scrambling table at 86. At the same time, the CSS keys (or key) which are supplied externally are used to encrypt the particular selected sectors at 88. The scrambling table 90 is used for determination of the scrambling of the data frame at 86.

The next step at 94 is to calculate and insert inter and outer Reed-Solomon error codes and distribute these among the recording frames. Next the EFM modulation is conventionally carried out at 96 followed by splitting the resulting modulated data into 91 byte half rows. The sync symbols are selected and inserted at 98, as described above resulting in the output data 100 supplied to the laser beam recorder. Note that in some respects the DVD mastering tool of FIG. 7 overlaps in functionality with the DVD authoring tool of FIG. 6 in terms of the CSS encryption. This shows that the CSS encryption can be performed by either entity. Note that the CSS encryption would not be performed in both tools, however for any given DVD production.

Figure 8:
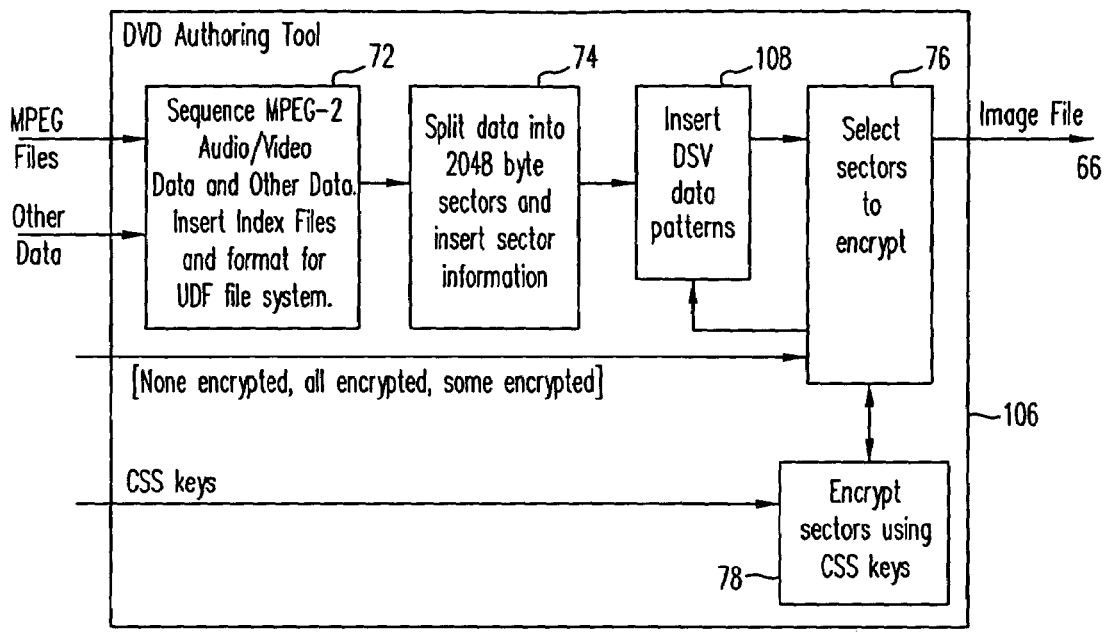
FIG. 8 shows in accordance with this disclosure use of a DVD authoring tool.

FIG. 8 shows a DVD authoring tool 106 in most respects similar to that of FIG. 6 but using the DSV data pattern insertion accordance with the present method. Hence FIG. 8 has the additional step 108 of inserting the DSV data patterns prior to determining which sectors to CSS encrypt. This step corresponds to FIG. 3 at 44a, 44b, and 22a, 22b. The resulting image file 66 contains data modified by the selective addition of the DSV data patterns in accordance with this disclosure.

In FIG. 8 the DSV patterns insertion at 108 is prior to the CSS encryption but is under control of the CSS sector selector 22a, 22b of FIG. 3.

Figure 9:
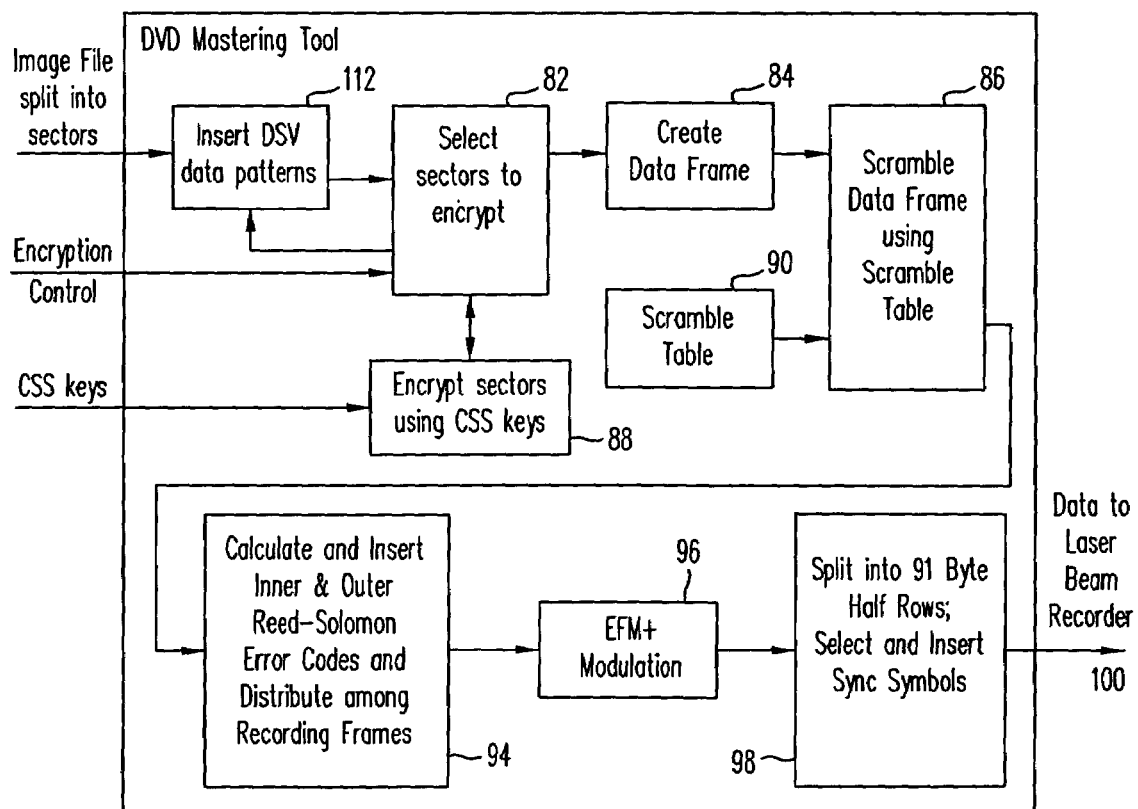
FIG. 9 shows in accordance with this disclosure use of a DVD mastering tool to produce a DVD.

FIG. 9 shows a DVD mastering tool 110 in most respects similar to the mastering tool 80 in FIG. 7 and having various elements similarly labeled. However, DVD mastering tool 110 further includes step 112 which inserts the DSV data patterns prior to CSS encryption. Again in FIG. 9 the DSV patterns are inserted only in those sectors that are to be CSS encrypted. The CSS sector selection in step 82 triggers the DSV data pattern inserter at 112 when it determines that a sector is to be CSS encrypted.

It is to be appreciated that in general the processes shown in the tools of FIGS. 8 and 9 are carried out in commercially available software, with the elements added herein readily programmable by one of ordinary skill in the art in light of this disclosure.

Other aspects of the implementation of the present system are largely conventional. For instance, if CSS encryption is applied to a particular sector, conventionally there is provided a CSS indicator bit at or near the beginning of each sector indicating by its value the presence or absence of the CSS encryption in that sector. The CSS keys, although referred to here in the plural, are in one embodiment only one single key per DVD, provided for instance in the DVD lead-in or lead-out area as is conventional.

Moreover, while the above describes producing a DVD, this is not limiting and the present method is applicable to other types of optical disks. Moreover, the use of EFM modulation here is not limiting and the present method is independent of the type of modulation used. Moreover, while the description here is of CSS encryption of certain sectors, this again is not limiting. Any other type of suitable transformation that would affect the DSV values may be used instead. Hence it is not even necessary that there be an encryption of the data as long as there is a suitable transformation to the data affecting DSV values. Other suitable transformations for example include inverting some number of bits in each byte, or other known forms of encryption such as DES or AES.

The actual nature of the DSV patterns may take any one of a number of forms. A typical DSV pattern length is two to 20 bytes. The number of DSV patterns inserted per block of data is typically 1,000 to 5,000 bytes of DSV data. (Typically a block of data is 32 sectors long. Each sector is approximately 2 K bytes long, as described above.) The repetition rate of the DSV patterns is optional, but for instance they are repeated every one half second to 5 seconds of play time. With these exemplary parameters, selection of the DSV patterns is routine to one of ordinary skill in the art. It has been found useful to determine experimentally what DSV patterns are most effective in terms of operating with the various types of DVD writers on the market to inhibit copying. Hence optimizing the DSV patterns is dependent upon the universe of DVD writers and players in the hands of consumers.

It is generally desirable in the DVD industry that the "overhead" of the added DSV patterns be limited, for instance, to less than 1% of the total content of the disc. However, again this is not limiting.

Moreover while the description here is largely of DVDs, this is not limited to the standard DVD formats but applies to other DVD formats such as DVD audio, DVDs with CPPM encryption (CPPM is Content Protection for Pre-recorded Media as licensed by the 4C Entity, LLC.) and others as well as other types of optical discs such as CDs if they use suitable encryption/transformations. The Redbook CD standard has no encryption, but the Yellowbook CD standard allows for a second "session" which could have encrypted data and so is relevant.

This disclosure is illustrative but not limiting; further modifications will be apparent to one skilled in the art in light of this disclosure and are intended to fall within the scope of the appended claims.

What is claimed as new and desired to be protected by Letters Patent of the United States is:

1. A method of copy protecting content data on a consumer CD or DVD optical disk suitable for playing on a typical player, the content data being organized in a plurality of sectors, comprising the acts of:
    inserting predetermined data patterns into selected ones of the sectors, the data patterns including, when played back, repeated patterns of values;
    applying content scrambling system (CSS) encryption to each of the selected sectors; and
    providing the content data including the selected CSS encrypted sectors, the remaining sectors, and at least one key associated with CSS decryption of the selected sectors wherein the predetermined data patterns are each hidden by the CSS encryption;
    writing the provided data to an optical disk master; and
    making a plurality of consumer CD or DVD optical disks from the optical disk master, wherein on the consumer CD or DVD optical disks, the predetermined data patterns are each hidden by the CSS encryption and decrypted in the typical player upon play of the consumer CD or DVD; wherein the predetermined data patterns are Digital Sum Value (DSV) data patterns, there being a plurality of the DSV data patterns on each optical disk, each of the plurality of DSV data patterns being 2 to 20 bytes in length and there being 1,000 to 5,000 bytes of DSV data patterns for each 32 of the plurality of the sectors.

2. The method of claim 1, wherein the DSV data patterns are such as to cause a digital sum value of a playback of the data to have an absolute value greater than a predetermined value.

3. The method of claim 1, wherein the DSV data patterns are such as to cause a digital sum value of a playback of the data to have a rate of change greater than a predetermined value.

4. The method of claim 1, wherein the DSV data patterns are such as to cause a digital sum value of a playback of the data to have a predetermined low frequency component.

5. The method of claim 1, wherein the selected ones of the sectors are one out of each four sectors.

6. The method of claim 1, further comprising the acts of:
    inserting index files into the data; and
    formatting the data.

7. The method of claim 1, further comprising the acts of:
    organizing the data into data frames;
    scrambling the data frames;
    determining error codes to the data; and
    modulating the data.

8. A consumer CD or DVD optical disc suitable for playing on a typical player and carrying content data comprising:
    a first plurality of sectors each including content data subjected to content scrambling system (CSS) encryption;
    a second plurality of sectors each including content data not subjected to the CSS encryption; and
    at least one key associated with CSS decryption of the first plurality of sectors;
    wherein the first plurality of sectors also each include a predetermined data pattern subject to the CSS encryption which upon being CSS decrypted and played back includes a repeated pattern of values wherein the predetermined data patterns are each hidden by the CSS encryption, and none of the second plurality of sectors include such a predetermined data pattern; wherein the predetermined data patterns are decrypted in the typical player upon play of the consumer CD or DVD; wherein the predetermined data patterns are Digital Sum Value (DSV) data patterns, there being a plurality of the DSV data patterns on each optical disk, each of the plurality of DSV data patterns being 2 to 20 bytes in length and there being 1,000 to 5,000 bytes of DSV data patterns for each 32 of the plurality of the sectors.

9. The disc of claim 8, wherein the DSV data patterns are such as to cause a digital sum value of the playback of the data to have an absolute value greater than a predetermined value.

10. The disc of claim 8, wherein the DSV data patterns are such as to cause a digital sum value of the playback of the data to have a rate of change greater than a predetermined value.

11. The disc of claim 8, wherein the DSV data patterns are such as to cause a digital sum value of the playback of the data to have a predetermined low frequency component.

12. The disc of claim 8, wherein the first plurality of the sectors is one out of four of the sectors.

13. The disc of claim 8, the data further comprising index files.

14. The disc of claim 8, wherein:
    the data is organized into data frames;
    the data frames are scrambled; and the data further comprising error codes.

* * * * *

UNITED STATES PATENT AND TRADEMARK OFFICE
CERTIFICATE OF CORRECTION

| | | |
|---|---|---|
| PATENT NO. | : 7,624,282 B2 | Page 1 of 1 |
| APPLICATION NO. | : 10/964572 | |
| DATED | : November 24, 2009 | |
| INVENTOR(S) | : Mark A. Hollar | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this

Twenty-sixth Day of October, 2010

David J. Kappos
*Director of the United States Patent and Trademark Office*